(12) United States Patent
Phillips

(10) Patent No.: US 6,264,224 B1
(45) Date of Patent: Jul. 24, 2001

(54) DUAL DRIVE BICYCLE

(76) Inventor: Cal M. Phillips, 4435 Jewell La., Platteville, WI (US) 53818

( * ) Notice: Subject to any disclaimer, the term of this patent is extended or adjusted under 35 U.S.C. 154(b) by 0 days.

(21) Appl. No.: 09/451,798

(22) Filed: Dec. 1, 1999

(51) Int. Cl.[7] .............................. B62M 1/00; B62M 1/14
(52) U.S. Cl. ........................................... 280/234; 280/250
(58) Field of Search ................................... 280/230, 233, 280/234, 235, 242.1, 249, 250

(56) References Cited

U.S. PATENT DOCUMENTS

| | | | |
|---|---|---|---|
| 2,533,728 | * 12/1950 | Gedat et al. ........................ 280/233 |
| 3,823,959 | 7/1974 | Winters . | |
| 3,910,599 | 10/1975 | Thomas . | |
| 4,109,927 | 8/1978 | Harper . | |
| 4,152,005 | 5/1979 | Vanore . | |
| 4,270,766 | 6/1981 | Thomas . | |
| 4,303,255 | 12/1981 | Thomas . | |
| 4,313,616 | 2/1982 | Boivin . | |
| 4,417,742 | 11/1983 | Intengan . | |
| 4,498,684 | 2/1985 | Intengan . | |
| 4,548,420 | 10/1985 | Patroni, Jr. . | |
| 4,653,613 | 3/1987 | Blaucas . | |
| 4,685,692 | 8/1987 | Fullilove et al. . | |
| 4,773,662 | 9/1988 | Phillips . | |
| 5,082,302 | * 1/1992 | Nacar ................................... 280/234 |
| 5,152,729 | 10/1992 | Phillips . | |
| 5,908,199 | * 6/1999 | Rigato ................................. 280/233 |
| 6,099,009 | * 8/2000 | Schroeder ........................... 280/234 |

* cited by examiner

Primary Examiner—Brian L. Johnson
Assistant Examiner—Matt Luby
(74) Attorney, Agent, or Firm—John V. Stewart

(57) ABSTRACT

A compact, covered front wheel drive assembly that replaces the handlebars on an existing bicycle frame. It drives the front wheel while standard bicycle foot pedals and drive train drive the rear wheel. However, it can also be operated independently of the foot pedals, or locked for use of the foot pedals alone. It has drive ratios and shifting that are independent of the rear drive train, and are configured for selectable, comfortable hand cranking rates, including normal bicycle cruising speed. Shift levers are mounted within reach of a rider's thumbs, without removing a hand from the cranks. A brake lever on each handle holds the brake cables forward at all times, eliminating interference both with the hand cranks and with obstacles brushing beside the bicycle.

5 Claims, 4 Drawing Sheets

DUAL DRIVE BICYCLE

BACKGROUND OF THE INVENTION

1. Field of the Invention

This invention relates to velocipedes, especially bicycles, having hand cranked propulsion for the front wheel.

2. Description of Prior Art

Bicycles and other velocipedes with hand cranks to drive the front wheel are known in the prior art. These have not become highly popular due to cost, inconvenience, bulkiness, and lack of appropriate drive trains make bicycle cruising speeds practical.

U.S. Pat. No. 4,773,662 by this inventor discloses advances over the prior art. The present invention is safer, less bulky, more convenient, and more attractive than that earlier design. This is due to improvements in the front drive train configuration and geometry and other improvements, including an improved brake lever design, and repositioning of the shifter levers.

Several other patents show velocipedes with hand cranked propulsion, and are listed here for reference. They show a variety of designs that are dissimilar to the present invention in some or all respects, and have inherent disadvantages. For example, many of them use hand cranks in which the left and right cranks are offset 180 degrees from each other This type of alternating crank is not stable enough to allow the crank handles to be used for steering a bicycle while cranking.

Prior related U.S. Pat. Nos. include: 4,773,662 (Phillips, 1988); 4,152,005 (Vanore, 1979); 4,270,766 (Thomas, 1981); 3,910,599 (Thomas, 1975); 3,823,959 (Winters, 1974); 4,109,927 (Harper, 1978); 4,303,255 (Thomas, 1981); 4,316,616 (Boivin, 1982); 4,417,742 (Intengan, 1983); 4,498,684 (Intengan, 1985); 4,548,420 (Patroni, Jr., 1985); 4,653,613 (Biancas, 1987); 4,685,692 (Fullilove et al., 1987).

SUMMARY OF THE INVENTION

The objectives of the present invention are provision of a bicycle with independent front and rear cranks and drive trains, so that either one or both cranks can be used to propel the bicycle. Another objective is provision of a front drive assembly that can be fitted to existing bicycle frames. Another objective is a front drive train that is compact and covered, for safety, appearance, and reduced bulk. Another objective is provision of gear shifters that can be operated without releasing a hand from the hand crank. Another objective is provision of brake levers from which the brake cables extend directly forward to eliminate interference with the crank and to avoid catching on obstacles while riding.

The objectives of the present invention are achieved by a compact, covered front drive assembly that replaces the handlebars on an existing bicycle frame. It drives the front wheel while standard foot pedals and drive train drive the rear wheel. However, it can also be operated independently of the foot pedals, or locked for use of the foot pedals alone. It has drive ratios and shifting that are independent of the rear drive ratios, and that are configured for comfortable hand cranking rates, including normal bicycle cruising speed. Shift levers are mounted within reach of a rider's thumbs, without removing a hand from the cranks. A brake lever on each handle holds the brake cables forward at all times, eliminating interference both with the hand cranks and with obstacles brushing beside the bicycle.

REFERENCE NUMBERS

Figure 1:
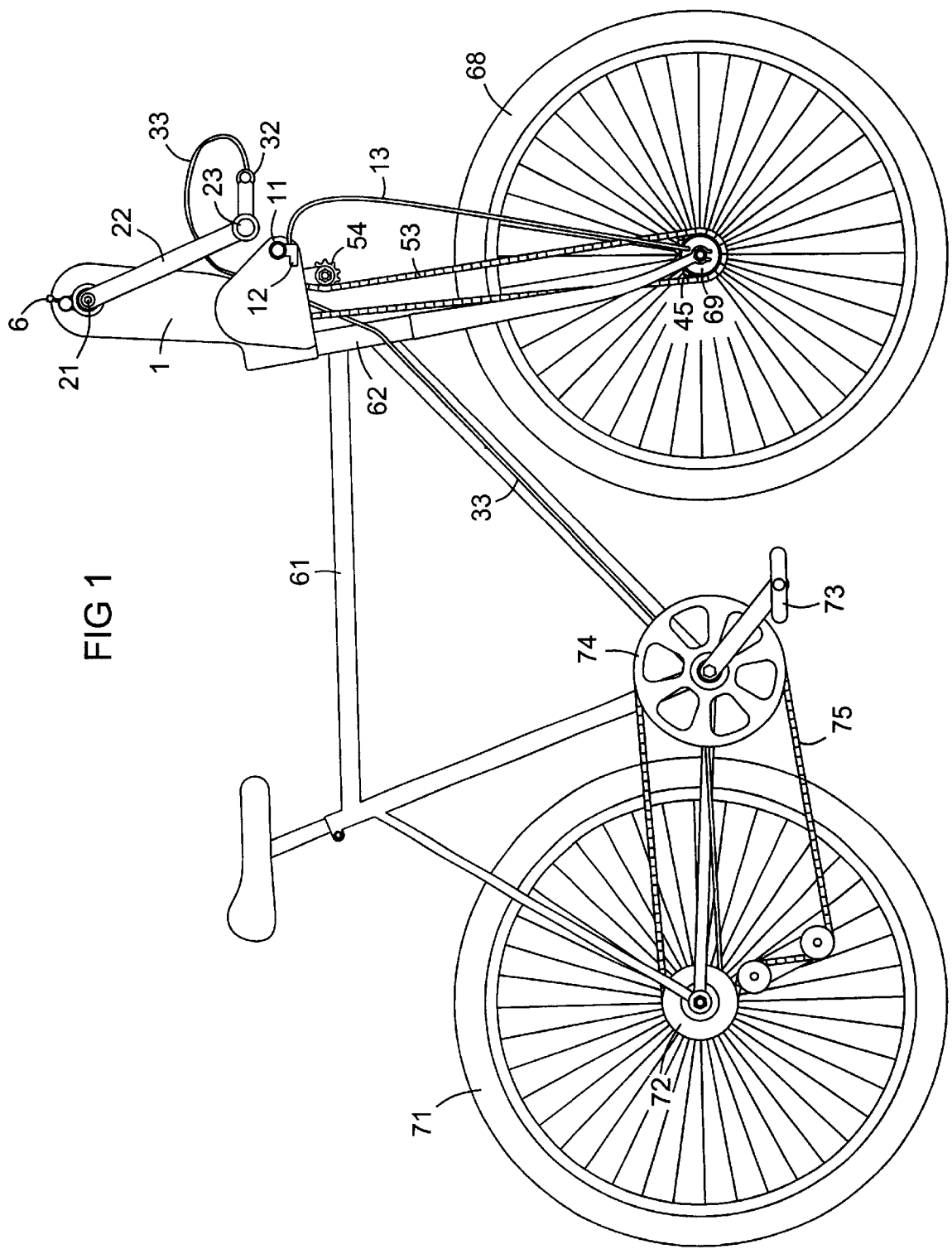
FIG. 1 is a right side view of a dual drive bicycle exemplifying the invention.
Figure 2:
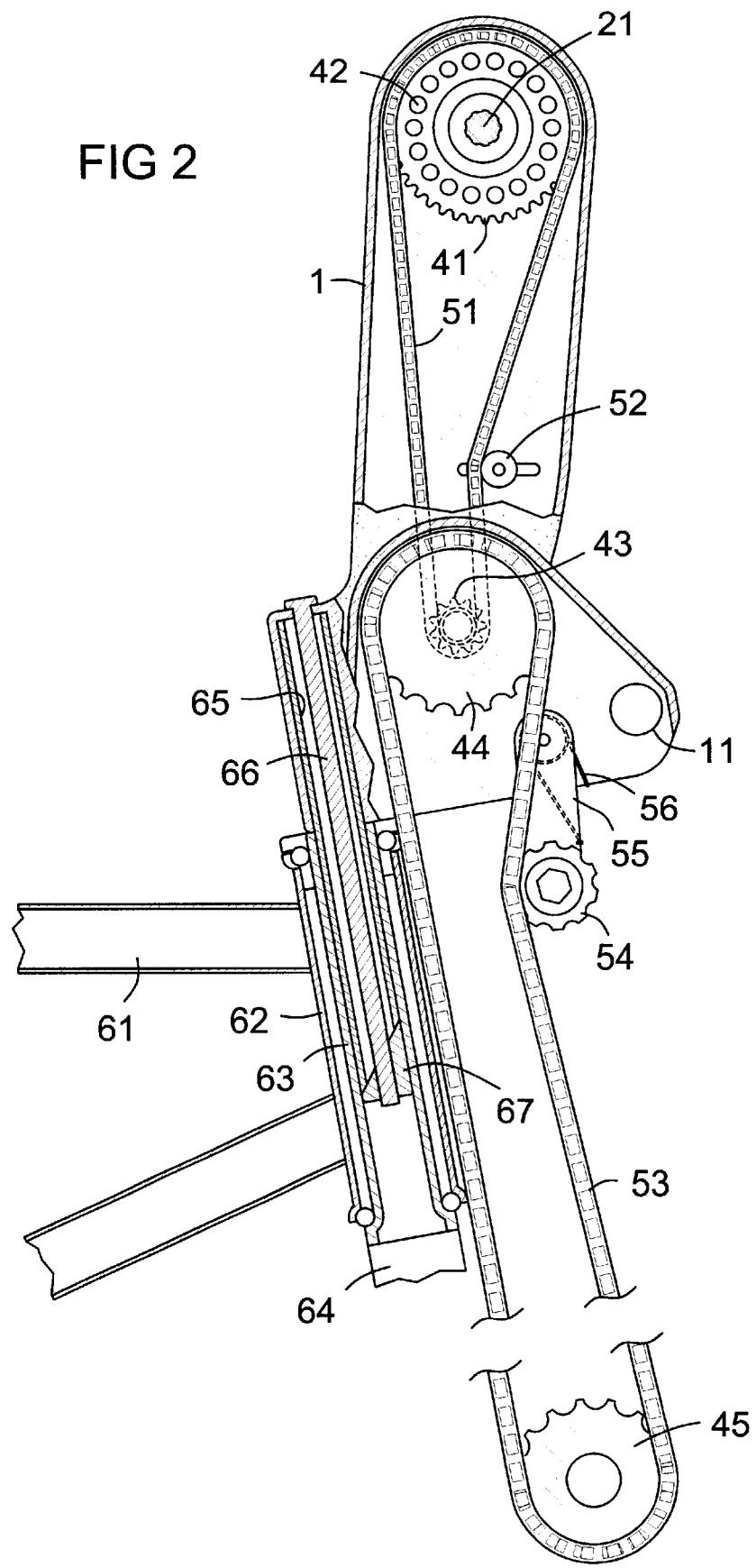
FIG. 2 is a right side sectional view of the hand crank assembly and front drive chain.
Figure 3:
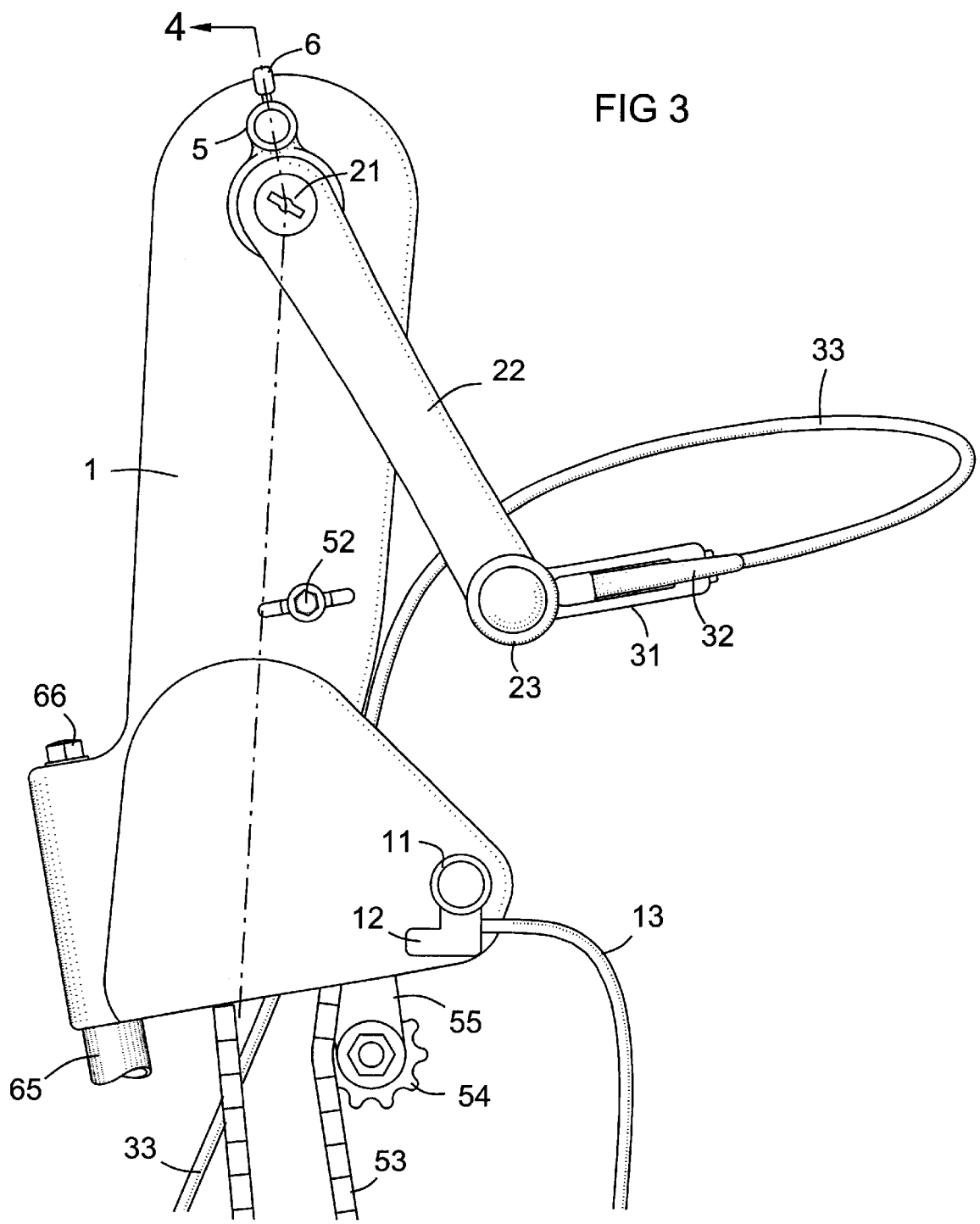
FIG. 3 is a right side view of the front drive assembly.
Figure 4:
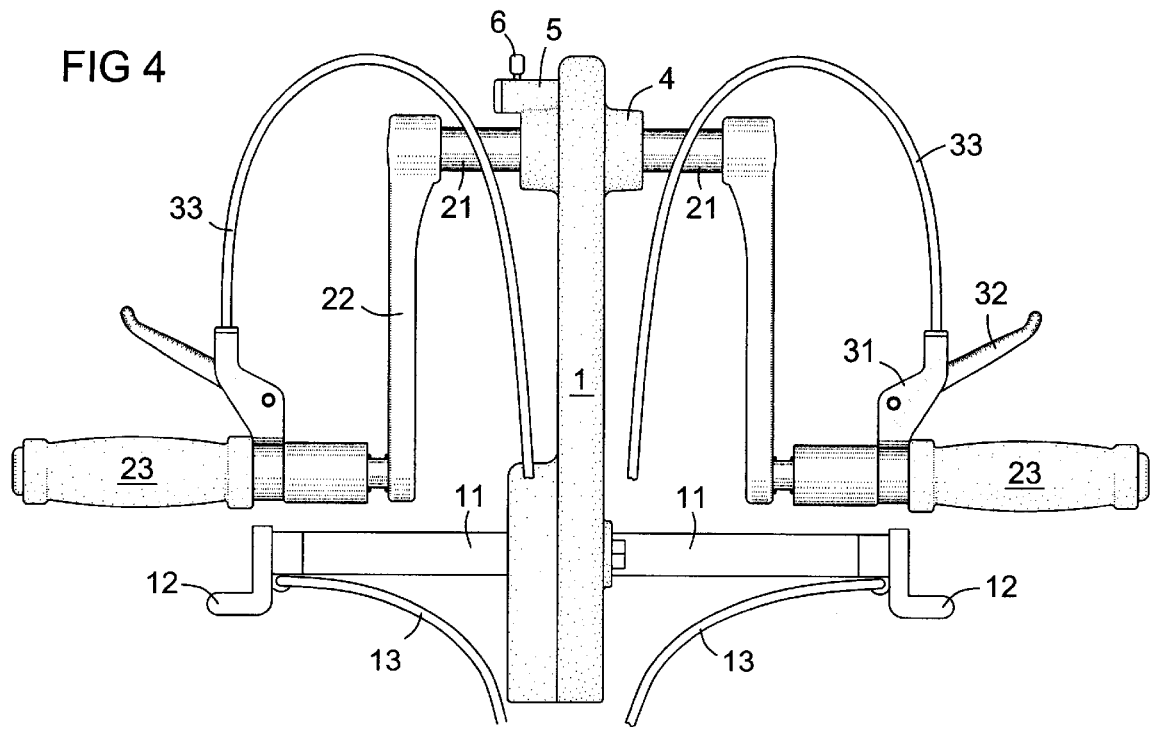
FIG. 4 is a front external view of the hand crank assembly. The brake levers are rotated upward for clarity In this view. Normally they are forward.
Figure 5:
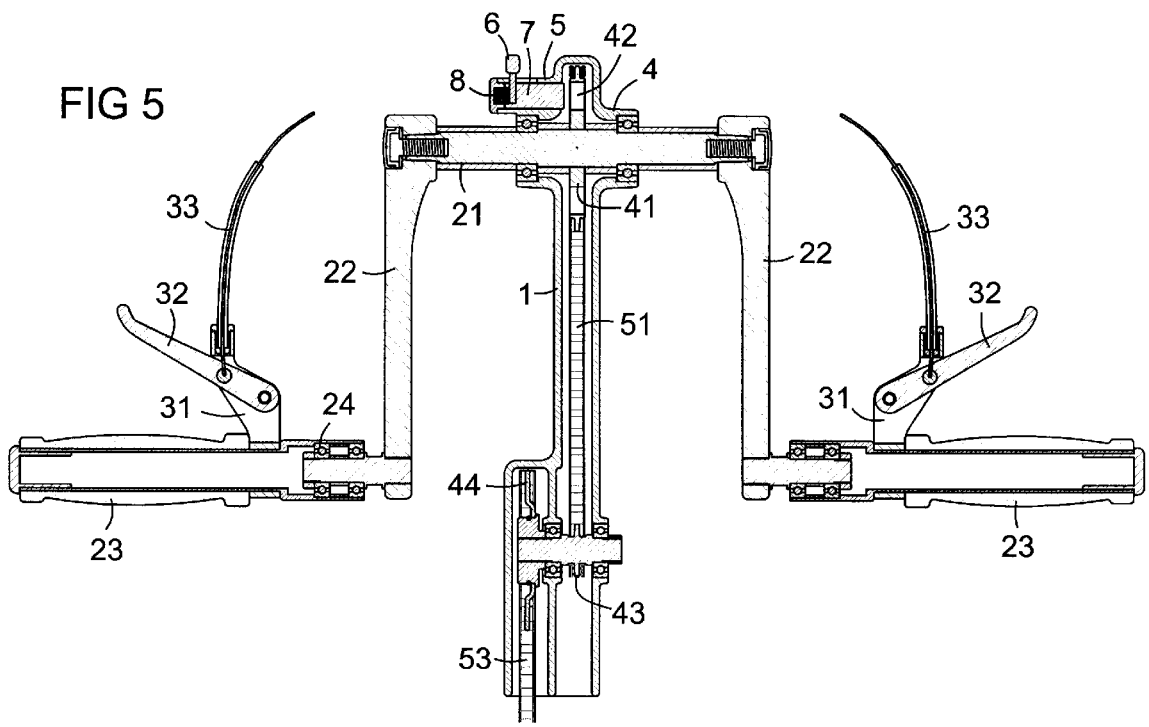
FIG. 5 is a is a front sectional view in the same position as FIG. 4, taken along section line 4 of FIG. 3.

1. Transmission case or frame
4. Crankshaft boss
6. Locking pin button
7. Locking pin
8. Locking pin spring
11. Shifter bar
12. Shifter thumb lever
13. Shifter cable
21. Crankshaft
22. Crank arm
23. Handle
24. Handle bearing
31. Brake lever frame
32. Brake lever
33. Brake cable
41. First sprocket
42. Locking pin hole
43. Second sprocket
44. Third sprocket
45. Fourth sprocket, which is on front wheel hub
51. First drive chain
52. First drive chain tensioner
53. Second drive chain
54. Second drive chain tensioner
55. Second drive chain tensioner arm
56. Second drive chain tensioner spring
61. Bicycle frame
62. Bicycle head tube
63. Bicycle steering tube
64. Bicycle front fork
65. Stem
66. Drive case attachment bolt
67. Expansion nut
68. Front wheel
69. Front wheel hub
71. Rear wheel
72. Rear wheel hub
73. Foot pedal
74. Chain ring
75. Rear drive chain

DESCRIPTION OF THE PREFERRED EMBODIMENTS

The invention is a dual-drive bicycle having a hand crank for driving the front wheel, and standard foot pedals for driving the rear wheel. The hand crank takes the place of handlebars, and is also used for steering.

A case or frame 1 for the front drive assembly is attached to the top end of a standard bicycle steering tube 63. A crankshaft 21 is mounted horizontally through the drive case. A crank arm 22 is attached to each end of the crankshaft. A handle 23 extends laterally from each crank arm. The handles are connected to the crank arms by bearings 24 that freely rotate. The two crank arms preferably extend in the same radial direction from the crankshaft, so the left and right handles rotate in unison. This provides better steering control than with alternating crank arms.

The crankshaft is attached to a first sprocket 41 in one end of the case, which drives a smaller second sprocket 43 in a second end of the case via a first circular chain 51. The second sprocket is fixed coaxially to a third sprocket 44, which is also in the second end of the case. The third sprocket drives a second chain 53, which drives a sprocket 45 on the front hub. The sprocket sizes are configured to increase the drive ratio from the hand crank to the front wheel to allow a comfortable rate of rotation of the crank when at a bicycle cruising speed.

The first and second sprockets and the first chain preferably have a pitch smaller than ½ inch. For example, number 25 industrial chain and sprockets can be used, which have a pitch of ¼ inch. This provides a more compact assembly than is possible with standard bicycle drive chain having ½" pitch. An example of a suitable front drive train includes a first sprocket with 40 teeth, a second sprocket with 10 teeth, a third sprocket with 19 teeth, and a fourth sprocket with 19 teeth. This gives an overall drive train ratio of 1-to-4. Each revolution of the first sprocket produces four revolutions of the fourth sprocket, whether the two chains have the same pitch or a different pitch. This particular ratio is suitable for use with a three-speed internally geared front hub. Many other combinations are possible, depending on the drive ratio desired for a given product, and the type of gearing on the front hub, if any.

The drive case is the structural support for the hand crank and sprockets, and covers the first chain to prevent catching of a rider's clothes or accessories in the chain. The case also reduces dust buildup on the chain and sprockets. The case is preferably generally vertically elongated, with the crankshaft and first sprocket at the top end and the second and third sprockets at the bottom end. This orientation provides the most compact appearance of the front drive. The case is open at the bottom, where the second chain exits the case to reach the front wheel hub. The case can be sand-cast as a single piece if the openings in the bottom, and the passages within the case, are large enough to admit the sprockets. Otherwise, it can be assembled from parts.

Chain tensioners should be provided for all the drive chains. In the embodiment shown, a first chain tensioner 52 is an idler wheel mounted on a bolt through the case. The bolt is tightened at a selectable position along a slot to adjust the tension of the first chain 51. A second chain tensioner 55 is an idler wheel on a pivoting lever 54 urged toward the second chain 52 by a torsion spring 56. A large spring-loaded tensioner, as shown on the rear drive chain 75 in FIG. 1, is used with a rear derailleur as known in the art. Other tension adjustment means as known in the art can be used for the rear chain if an internally geared hub is provided.

A locking pin 7 is provided to stop the rotation of the hand crank. This is useful for relaxing the upper body or for negotiating tight turns, especially for an inexperienced rider. The locking pin passes through a hole 42 in the first sprocket to stop the sprocket. A locking pin knob 6 passes through an L-shaped slot in the locking pin boss 5, which holds the pin disengaged outward against a spring 8. When the pin is released from the holding point in the slot, the spring moves the pin inward to engage a hole in the first sprocket.

The case is attached to the bicycle steering tube by means of a stem 65 inserted into the top end of the steering tube 63. The stem is locked in the tube with an expansion nut 67 on the bottom end of a bolt 66 with an accessible head. This simple attachment means allows the front drive assembly to be fitted to a standard bicycle frame by replacing the handles and front hub with the front drive assembly. The front drive assembly can optionally be provided as a kit for upgrading existing bicycles.

The front hub preferably has a selection of gears or drive ratios. These are provided either inside the hub or on a derailleur, as known in the art. The drive ratio is controlled by a cable 13 that is operated by a thumb lever 12 as known in the art. The thumb lever is mounted on a bar 11 extending laterally from the case to a position adjacent one of the handles. This allows the rider to reach the thumb lever without removing a hand from the handle. The rider simply stops cranking temporarily at the position where the handle is adjacent the thumb lever, and reaches with the thumb to operate the thumb lever. During the pause in cranking the front wheel turns freely by means of a freewheel hub device, as is known in the art.

Preferably both left and right shifter bars and levers are provided. One shifter bar holds a lever to shift the front wheel drive ratio, and the other shifter bar holds one or more levers to shift the rear wheel drive ratio. The front hub is preferably an internally geared hub. The rear hub can be internally geared, but it is preferably provided with a derailleur instead. The pedal chain ring may also have a derailleur as is known in the art. Thus, three shift levers may be needed. Two of them can be placed on one of the shifter bars, within reach of the thumb. For example, the rear wheel derailleur lever can be mounted on the top side of the bar, the pedal chain ring derailleur lever can be mounted on the underside of the shifter bar, and the front wheel shifter lever can be mounted on the second shifter bar. Other configurations are possible. For example, the left and right shifter bars can hold two levers for two rear derailleurs, and the front hub shifter lever can be mounted on the back of the drive case.

Braking is provided on one or both wheels, either with hub internal brakes, wheel rim brakes, or a mixture of the two types of brake. A coaster brake is a hub internal brake that can be operated in the rear wheel hub by reversing the direction of the foot pedals, as known in the art. Other types of internal hub brakes are operated by cables controlled by hand levers, as is known in the art. Wheel rim brakes are also operated by cables controlled by hand levers. Preferably, left and right brake levers 32 are provided on the left and right crank handles respectively. Each lever operates either the front or the rear brake. Special brake levers are provided to avoid tangling or wrapping of the brake cables in the hand cranks. These brake levers hold the brake cables at right angles to the handles. As the cranks are rotated, the brake levers are continuously held forward on the handles by the rider. This is a natural consequence of the rider keeping the brake levers under the fingers, or within reach of them. Thus, the brake cables extend forward from the handles. This avoids interference between the brake cables and the cranks. It is preferable to a design with brake cables extending to the sides, which can catch on obstacles while riding.

This invention can be applied to other velocipedes using appropriate adaptations by those skilled in the art if needed. For tricycles no adaptation may be needed, since the front end of a tricycle can be the same as that of a bicycle.

Although the present invention has been described herein with respect to preferred embodiments, the foregoing description is intended to be illustrative, not restrictive.

Modifications of the present invention will occur to those skilled in the art. All such modifications that fall within the scope of the appended claims are intended to be within the scope and spirit of the present invention.

I claim:

1. A dual-drive bicycle, comprising:

a bicycle frame having a steerable front wheel with a hub and a rear wheel with a hub;

the front wheel connected to the frame by a steering tube, the steering tube having a top end;

a hollow, generally vertically elongated drive case attached to the top end of the steering tube, the case having top and bottom ends and left and right sides;

a crankshaft mounted horizontally laterally through the top end of the drive case, the crankshaft having left and right ends;

a left and a right crank arm on respective ends of the crankshaft, both crank arms extending in the same radial direction from the crankshaft;

a left and a right crank handle mounted rotatably on, and extending laterally from, each respective crank arm;

a first sprocket mounted on the crankshaft inside the drive case;

a second sprocket mounted in the bottom end of the drive case in coplanar relation to the first sprocket;

a third sprocket fixed coaxially to the second sprocket in the bottom of the drive case;

a fourth sprocket on the front wheel hub;

a first continuous chain around the first and second sprockets;

second continuous chain around the third and fourth sprockets;

the drive ratio increasing between the first and fourth sprockets, such that one rotation of the first sprocket results in more than one rotation of the fourth sprocket;

a brake lever mounted on at least one of the crank handles;

a brake cable having first and second ends, the first end of the brake cable connected to the brake lever in an orientation substantially perpendicular to said one of the crank handles;

a brake mounted on the bicycle frame adjacent one of the wheels; and the second end of the brake cable connected to the brake;

whereby a rider on the bicycle can crank the handles in unison at a comfortable rotation rate to propel a bicycle at a cruising speed on a road while continuously holding the brake lever, and the brake cable does not interfere with a the crank arms.

2. The dual-drive bicycle of claim 1, further comprising:

a shifter bar attached to the drive case and extending to a point that is adjacent one of said crank handles when said crankshaft is at a predetermined rotational position;

a shift lever attached to the shifter bar adjacent said one crank handle in said predetermined position;

a drive ratio changer operatively connected to at least one of said wheels;

a shifter cable operatively connected between the shift lever and the drive ratio changer;

whereby a rider on said bicycle can pause cranking the handles, and shift the drive ratio with a thumb without removing a hand from the crank handles.

3. A dual-drive bicycle, comprising:

a bicycle frame having a steerable front wheel and a rear wheel;

the front wheel connected to the frame by a steering tube, the steering tube having a top end;

a hollow drive case attached to the top end of the steering tube;

a crankshaft mounted horizontally through the drive case, the crankshaft having two ends;

a crank arm on each end of the crankshaft;

a crank handle mounted rotatably on each crank arm;

transmission means in the drive case for transmitting rotation of the crankshaft to the front wheel;

a freewheel hub on the front wheel that allows the front wheel to freely rotate when not driven by said transmission means;

a shifter bar attached to the drive case and extending to a point that is adjacent one of said crank handles when said crankshaft is at a predetermined rotational position;

a shift lever attached to the shifter bar adjacent said one crank handle in said predetermined position;

a drive ratio changer operatively connected to at least one of said wheels;

a shifter cable operatively connected between the shift lever and the drive ratio changer;

a brake lever mounted on at least one of said crank handles;

a brake cable having first and second ends, the first end of the brake cable connected to the brake lever in an orientation substantially perpendicular to said one of said crank handles;

a brake mounted on the bicycle frame adjacent one of said wheels; and the second end of the brake cable connected to the brake;

whereby a rider on said bicycle can grip the crank handles and crank them to propel the bicycle while continuously holding the brake lever without the brake cable interfering with the crank arms, and the rider can pause cranking and operate the shift lever with a thumb to change the drive ratio without releasing the crank handles.

4. A dual-drive bicycle, comprising:

a bicycle frame having a steerable front wheel and a rear wheel;

the front wheel connected to the frame by a steering tube, the steering tube having a top end;

a hollow drive case attached to the top end of the steering tube;

a crankshaft mounted horizontally through the drive case, the crankshaft having two ends;

a crank arm on each end of the crankshaft;

a crank handle mounted rotatably on each crank arm;

transmission means in the drive case for transmitting rotation of the crankshaft to the front wheel;

a freewheel hub on the front wheel that allows the front wheel to freely rotate when not driven by said transmission means;

a brake lever frame mounted on at least one of said crank handles;

a brake lever pivotally mounted on the brake lever frame;

a brake cable connected to the brake lever;

a brake cable sheath around the brake cable, retained in the brake lever frame, and extending substantially perpendicularly away from said one crank handle;

a brake connected to at least one of said wheels;

the brake cable connected to said brake;

whereby a rider on the bicycle can grip the crank handles and crank them to propel the bicycle while continuously holding the brake lever, and the brake cable does not interfere with a the crank arms.

5. The dual-drive bicycle of claim 4, further comprising:

a shifter bar attached to the drive case and extending to a point that is adjacent one of said crank handles when said crankshaft is at a predetermined rotational position;

a shift lever attached to the shifter bar adjacent said one crank handle in said predetermined position;

a drive ratio changer operatively connected to at least one of said wheels;

a shifter cable operatively connected between the shift lever and the drive ratio changer;

whereby a rider on said bicycle can pause cranking and shift the drive ratio with a thumb without releasing the crank handles.

* * * * *